(12) United States Patent
Usami et al.

(10) Patent No.: US 10,705,263 B2
(45) Date of Patent: Jul. 7, 2020

(54) LENS SYSTEM AND VARIABLE FOCAL LENGTH LENS APPARATUS

(71) Applicant: MITUTOYO CORPORATION, Kanagawa (JP)

(72) Inventors: Atsushi Usami, Kanagawa (JP); Masaki Okayasu, Tokyo (JP)

(73) Assignee: MITUTOYO CORPORATION, Kanagawa (JP)

( * ) Notice: Subject to any disclaimer, the term of this patent is extended or adjusted under 35 U.S.C. 154(b) by 76 days.

(21) Appl. No.: 15/854,226

(22) Filed: Dec. 26, 2017

(65) Prior Publication Data

US 2018/0180773 A1 Jun. 28, 2018

(30) Foreign Application Priority Data

Dec. 28, 2016 (JP) .................. 2016-255847

(51) Int. Cl.
| | | |
|---|---|---|
| *G02B 3/14* | (2006.01) | |
| *G02B 26/00* | (2006.01) | |
| *G03B 5/00* | (2006.01) | |
| *G03B 15/02* | (2006.01) | |

(52) U.S. Cl.
CPC ............ *G02B 3/14* (2013.01); *G02B 26/004* (2013.01); *G03B 5/00* (2013.01); *G03B 15/02* (2013.01); *G03B 2205/0061* (2013.01)

(58) Field of Classification Search
CPC .......... G02B 3/14; G02B 3/12; G02B 26/004; G03B 15/02; G03B 2205/0061; G02F 1/33

USPC .......................................... 359/305–314, 665
See application file for complete search history.

(56) References Cited

U.S. PATENT DOCUMENTS

| | | | | |
|---|---|---|---|---|
| 2008/0259463 A1* | 10/2008 | Shepherd | ................ | G02B 3/14 |
| | | | | 359/666 |
| 2010/0177376 A1* | 7/2010 | Arnold | ................ | G02B 3/0087 |
| | | | | 359/307 |
| 2012/0155230 A1* | 6/2012 | Patt | ........................ | G04B 37/02 |
| | | | | 368/291 |
| 2013/0141782 A1 | 6/2013 | Theriault et al. | | |
| 2014/0104488 A1* | 4/2014 | Samuels | ............. | H04N 5/2252 |
| | | | | 348/374 |

OTHER PUBLICATIONS

Merriam-Webster definition Foam, https://www.merriam-webster.com/dictionary/foam.*

* cited by examiner

*Primary Examiner* — Travis S Fissel
(74) *Attorney, Agent, or Firm* — Greenblum & Bernstein, P.L.C.

(57) ABSTRACT

A lens system includes a tubular vibrating member that vibrates due to an input drive signal; a case accommodating the vibrating member; a fluid that fills the case and immerses the vibrating member; and a pressure mitigating member that is installed in a gap between the vibrating member and the case, further outward than the vibrating member. A foam body made of fluororubber and having a large number of closed cells is used as the pressure mitigating member.

8 Claims, 10 Drawing Sheets

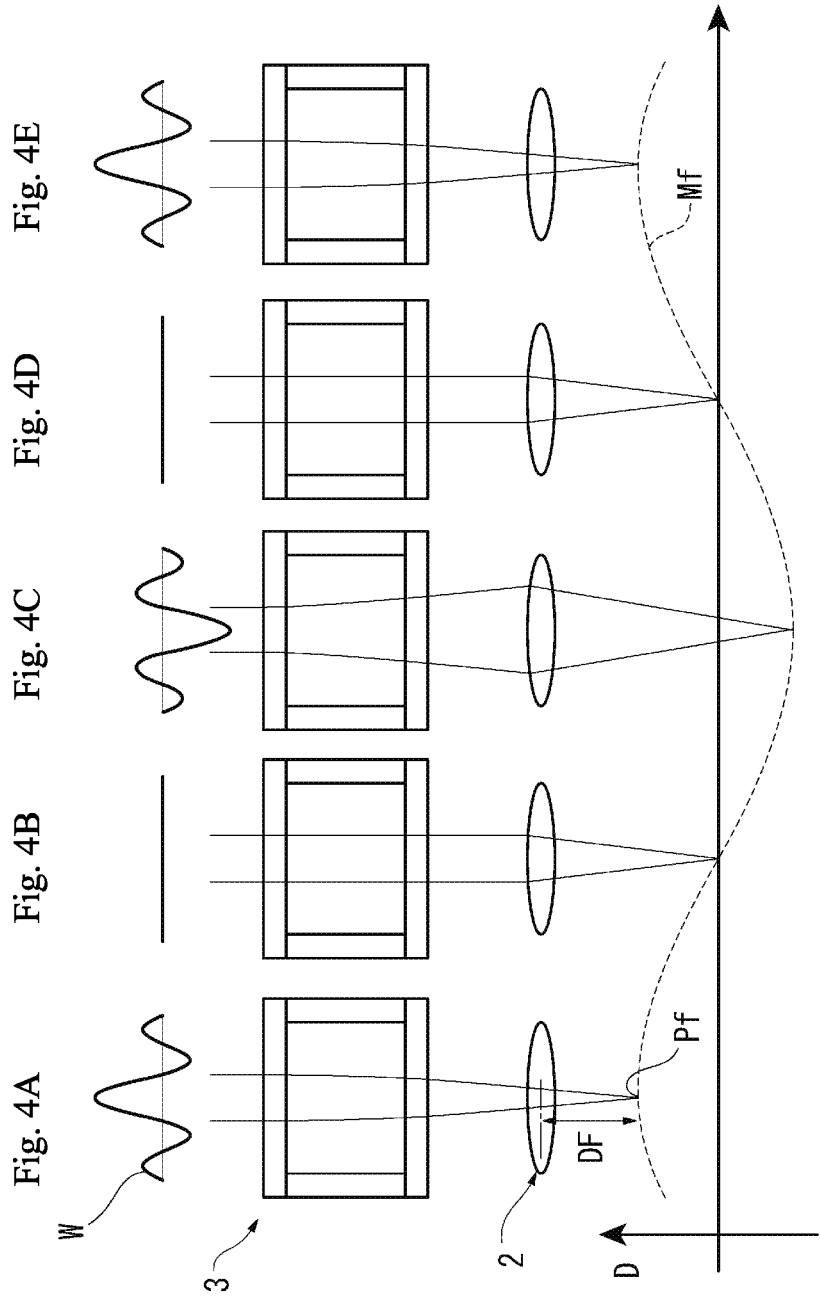

LENS SYSTEM AND VARIABLE FOCAL LENGTH LENS APPARATUS

CROSS-REFERENCE TO RELATED APPLICATIONS

The present application claims priority under 35 U.S.C. § 119 of Japanese Application No. 2016-255847, filed on Dec. 28, 2016, the disclosure of which is expressly incorporated by reference herein in its entirety.

BACKGROUND OF THE INVENTION

1. Field of the Invention

The present invention relates to a lens system and a variable focal length lens apparatus.

2. Description of Related Art

As a variable focal length lens apparatus, an apparatus has been developed that uses a fluid lens system (hereafter referred to simply as "lens system") operating on a principle described by the specification of U.S. Published Patent Application No. 2010/0177376, for example. The lens system is formed by immersing in a transparent fluid a hollow cylindrical vibrating member formed of a piezoelectric material. In the lens system, when AC voltage is applied to both an inner circumferential surface and an outer circumferential surface of the vibrating member, the vibrating member expands and contracts in a thickness direction and causes the fluid on an inner side of the vibrating member to vibrate. By adjusting a frequency of the applied voltage in response to the natural frequency of the fluid, a standing wave of concentric circles is formed in the fluid and concentric circular regions having different refractive indexes are formed centered on a center axis line of the vibrating member. Therefore, in the lens system, when light transits along the center axis line of the vibrating member, the light travels along a path that either magnifies or reduces the light in accordance with the refractive index of each concentric circular region.

A variable focal length lens apparatus is configured by arranging the lens system described above and, for example, a field lens using an ordinary convex lens on the same optical axis. When parallel light strikes the ordinary convex lens, light passing through the lens comes into focus at a focal position that lies at a predetermined focal length. In contrast, when parallel light strikes the lens system arranged coaxially with the convex lens, the light is either magnified or reduced by the lens system and the light passing through the convex lens comes into focus at a position offset either farther away or closer than the original (state with no lens system) focal position. Accordingly, in the variable focal length lens apparatus, a drive signal (AC voltage of a frequency that generates a standing wave in the interior fluid) that is input to the lens system is applied, and by increasing or decreasing the amplitude of the drive signal, the focal position of the variable focal length lens apparatus can be controlled as desired within a set range (a predetermined amount of change allowing increase or decrease by the lens system, with the focal length of the field lens as a reference).

In the variable focal length lens apparatus, a sinusoidal AC signal is used as an exemplary drive signal that is input to the lens system. When such a drive signal is input, the focal length (focal position) of the variable focal length lens apparatus changes sinusoidally. In this case, when the amplitude of the drive signal is 0, the light transiting the lens system is not refracted and the focal length of the variable focal length lens apparatus is the focal length of the field lens. When the amplitude of the drive signal is at a positive or negative peak, the light transiting the lens system is maximally refracted and the focal length of the variable focal length lens apparatus is in a state having the greatest change from the focal length of the field lens. When an image is obtained using a variable focal length lens apparatus of this kind, a light emission signal is output to provide pulse illumination, synchronized with the phase of the sine wave of the drive signal. Accordingly, by providing pulse illumination in a state at a predetermined focal length, from among the sinusoidally changing focal lengths, the image of the measured object at the focal length is detected. Pulse illumination is performed at a plurality of phases that make up one period, and when image detection is performed in accordance with each phase, images at a plurality of focal lengths can be obtained simultaneously.

In the lens system described above, the temperature of the internal fluid changes due to an influence of outside air temperature, or heat produced in association with operation, or the like. When the temperature of the fluid changes, the fluid on the interior of the lens system expands, elevating the internal pressure, and the fluid may leak out. In order to alleviate the expansion of the fluid and the elevation in internal pressure associated with such an elevation in temperature, air or the like is injected into the fluid on the interior of the lens system to create bubbles. With such bubbles present, when the temperature rises, the bubbles are compressed in response to the expansion of the fluid and the system can be configured such that excessive increases in internal pressure do not occur on the interior of the case.

According to the lens system having injected air bubbles, described above, the expansion of the fluid and the elevation in internal pressure associated with the elevation in temperature can be mitigated by the air bubbles. However, when the air bubbles make their way into an optical path portion of the lens system (portion on the inner side of the vibrating member where the fluid generates the standing wave), the fluid may be unable to achieve sufficient resonance and the anticipated refractive index of the lens system may not be obtained. To counteract this, a measure may be enacted such as forming an indentation to hold the air bubbles in a portion of the case that houses the fluid, but when there is a significant change in the posture of the lens system, for example, the air bubbles may escape from the indentation and make their way to the optical path portion of the lens system, and may still influence optical characteristics.

SUMMARY OF THE INVENTION

The present invention provides a lens system and variable focal length lens apparatus that can avoid influencing optical characteristics while mitigating expansion of an interior fluid.

A lens system according to the present invention includes a tubular vibrating member that vibrates due to an input drive signal; a case accommodating the vibrating member; a fluid that fills the case and immerses the vibrating member; and a pressure mitigating member that is installed in a gap between the vibrating member and the case, further outward than the vibrating member.

In the present invention, even when the interior fluid expands due to an elevation in temperature, an elevation in pressure can be mitigated by the pressure mitigating member. Here, the pressure mitigating member is installed in the gap between the vibrating member and the case, further outward than the vibrating member, and does not displace as conventional bubbles do. The pressure mitigating member can therefore avoid influencing an optical path portion formed on an inner side of the vibrating member and can avoid influencing optical characteristics of the lens system. A site where the pressure mitigating member is installed is preferably further outward than the vibrating member and is in the gap between the vibrating member and the case. Specifically, a space between an outer surface of the vibrating member and an inner surface of the case, or a space between a circumferential edge in a continuous direction (direction in which the optical path extends) of the vibrating member and the facing inner surface of the case, can be used.

In the lens system of the present invention, the pressure mitigating member is preferably a foam body made of fluororubber and having a large number of closed cells.

In the present invention, even when the interior fluid expands due to an elevation in temperature, each of the closed cells are compressed by the pressure of the fluid and the overall volume of the pressure mitigating member is reduced, enabling the pressure on the interior of the lens system to be mitigated. Moreover, because the pressure mitigating member is made of fluororubber, oil resistance, chemical resistance, heat resistance, flame resistance, weather resistance, and ozone resistance can be ensured regardless of the type of fluid used on the interior of the lens system. Also, because of the closed cells, the pressure mitigating member can avoid unfavorable situations such as interior air leaking out when crushed by external pressure and being unable to restore an original shape.

A foam body having a large number of closed cells and made of a synthetic resin other than fluororubber may also be used as the pressure mitigating member according to the present invention. An envelope body having a pressure-compressible fluid sealed on an interior of the envelope, a box body that elastically deforms and reduces in volume due to external pressure, or the like may also be used. In addition to the closed cell foam body made of fluororubber, a closed cell foam body of a polyurethane resin, polystyrene resin, or the like can be used as the foam body made of a synthetic resin and having a large number of closed cells. These materials are commonly used in packaging applications, facilitate security of packed contents at low cost, and can also make effective use of a space within the case of the lens system due to the ready moldability of the materials.

An envelope body having air sealed in a polyethylene resin envelope can be used, for example, as the envelope body having a pressure-compressible fluid sealed on the interior of the envelope. Such a body is also commonly used in packaging applications, and facilitates the security of packed contents at low cost. In addition, the envelope body can be made pliable and can adapt to a large variety of shapes, and therefore can be readily pushed into a gap within the case of the lens system.

As an example of a box body that elastically deforms and reduces in volume due to external pressure, by configuring a flat metal box to have a shallow diaphragm in a flat surface of the box, for example, the diaphragm can bend inward when receiving external pressure. Alternatively, an elastic member biasing the diaphragm outward may also be installed on an inner side of the diaphragm. As a further example of a configuration that elastically deforms and reduces in volume due to external pressure, a configuration can also be used that makes use of a cylinder and a piston and displaces the piston toward an interior when receiving external pressure. With these configurations, an ability to mitigate pressure can be fine-tuned via the pressure-compressible fluid on the interior or the elasticity of the elastic member.

Moreover, in the lens system according to the present invention, a member formed with a material whose volume is reduced by an elevation in temperature may also be used as the pressure mitigating member. When such a pressure mitigating member is used, the volume of the pressure mitigating member decreases even when the interior fluid expands due to an elevation in temperature. When a balance in the amount of change between the expansion of the fluid and the decrease in volume of the pressure mitigating member is struck ahead of time, an expansion amount of the fluid can be canceled out by an amount of decrease in volume of the pressure mitigating member. Accordingly, the pressure on the interior of the lens system can be mitigated. An example of such a material, which decreases in volume due to an elevation in temperature, can include an oxide material "$BiNi_{1-x}Fe_xO_3$ (bismuth/nickel/iron oxide)" that exhibits "negative thermal expansion" at least double that of existing materials near room temperature, which was discovered by Professor Masaki Azuma, et al., of Tokyo Institute of Technology Applied Ceramics Lab through collaborative research with Chuo University, the Japan Synchrotron Radiation Research Institute, and Kyoto University.

A variable focal length lens apparatus according to the present invention includes a lens system where a refractive index changes in response to an input drive signal; a field lens arranged on the same optical axis as the lens system; an image detector detecting an image of a measured object through the lens system and the field lens; and a pulse illuminator providing pulse illumination of the measured object based on an input light emission signal. The lens system includes a tubular vibrating member that vibrates due to an input drive signal; a case accommodating the vibrating member; a fluid that fills the case and immerses the vibrating member; and a pressure mitigating member that is installed in a gap between the vibrating member and the case, further outward than the vibrating member.

In the present invention, a sinusoidal AC signal (frequency that generates a standing wave in the lens system), for example, is input as the drive signal to the lens system from a controller, causing the refractive index of the lens system to fluctuate. Thereby, a focal position of the variable focal length lens apparatus can be made to fluctuate at the surface of the measured object. In addition, the light emission signal is output by the controller at a specified phase having the drive signal as a reference, causing the pulse illuminator to emit light based on the light emission signal. Thereby, the image of the surface of the measured object at the focal length at the time of illumination can be guided through the field lens and the lens system toward the image detector, and can be detected as the detected image.

At this point, a temperature of the fluid on the interior of the lens system changes, and even when the interior fluid expands due to an elevation in temperature, an elevation in pressure can be mitigated by the pressure mitigating member. Here, the pressure mitigating member is installed in a gap between the vibrating member and the case, further outward than the vibrating member, and therefore has no influence on the optical path portion formed on the inner side of the vibrating member and can avoid influencing optical characteristics.

According to the present invention, a lens system and a variable focal length lens apparatus can be provided that can avoid influencing optical characteristics while mitigating expansion of an interior fluid.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein:

FIGS. 4A to 4E are schematic views illustrating a focal length of the lens system according to the embodiment;

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

Figure 1:
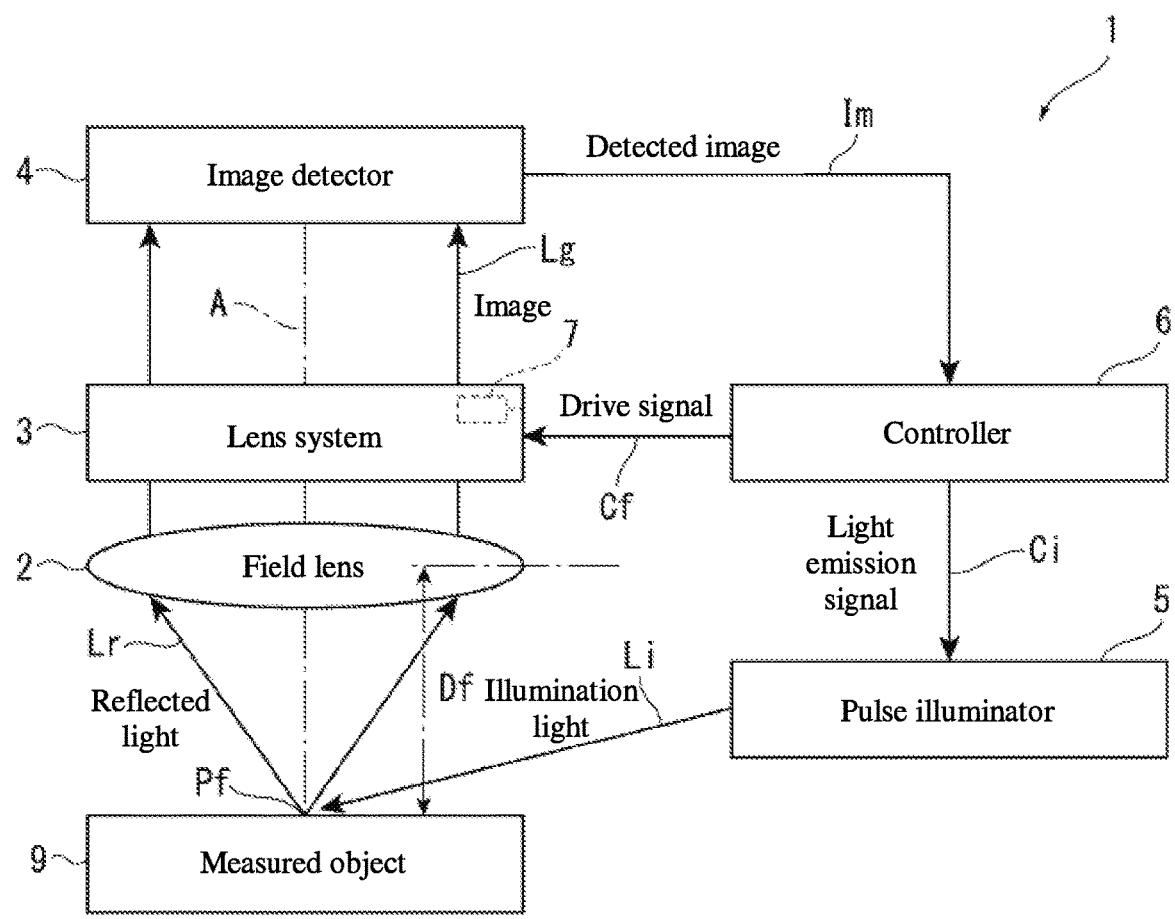
FIG. 1 is a block diagram illustrating an embodiment of a variable focal length lens apparatus of the present invention.

Hereafter, an embodiment of the present invention is described with reference to the drawings. In FIG. 1, in order to detect an image of a surface of a measured object (e.g., an object to be measured or a measurable object) 9 while varying a focal length, a variable focal length lens apparatus 1 is provided with a field lens 2, a lens system 3, and an image detector 4 all arranged on the same optical axis A that intersects with the surface. The variable focal length lens apparatus 1 further includes a pulse illuminator 5 providing pulse illumination of the surface of the measured object 9, and a controller 6 controlling the pulse illuminator 5, the image detector 4, and the lens system 3.

The field lens 2 is configured by a known convex lens. The image detector 4 is configured by a known charge coupled device (CCD) image sensor or some other form of camera, and can output to the controller 6 an incident image Lg as a detected image Im having a predetermined signal form. The pulse illuminator 5 is configured by a light emitting element such as a light emitting diode (LED), and when a light emission signal Ci is input from the controller 6, illumination light Li can be emitted for a predetermined amount of time and pulse illumination of the surface of the measured object 9 can be provided.

A refractive index of the lens system 3 changes in response to a drive signal Cf input from the controller 6. The drive signal Cf is a sinusoidal AC signal of a frequency that generates a standing wave in the lens system 3. In the variable focal length lens apparatus 1, a focal length Df to a focal position Pf can be changed as desired by changing the refractive index of the lens system 3 with the focal length of the field lens 2 as a reference.

Figure 2:
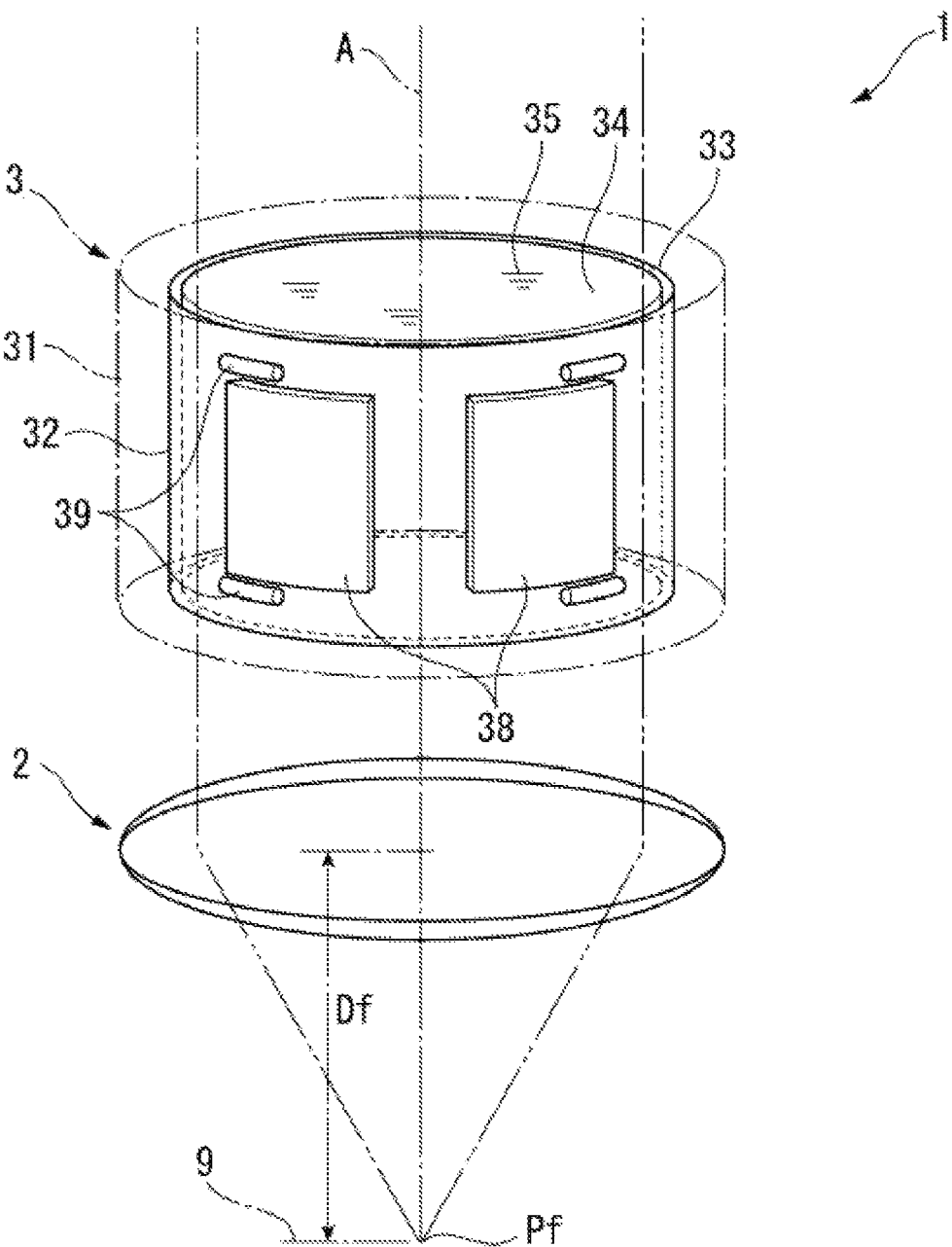
FIG. 2 is a perspective view illustrating a lens system according to the embodiment.

In FIG. 2, the lens system 3 includes a hollow cylindrical case 31, and a hollow cylindrical vibrating member (also referred to as a "vibrator") 32 is installed on an interior of the case 31. The vibrating member 32 is supported by spacers 39 made of an elastomer that are disposed between an outer circumferential surface 33 of the vibrating member 32 and an inner circumferential surface of the case 31. The vibrating member 32 is a member having a piezoelectric material formed in a hollow cylindrical shape. The vibrating member 32 vibrates in a thickness direction due to an AC voltage of the drive signal Cf that is applied between the outer circumferential surface 33 and the inner circumferential surface 34. The interior of the case 31 is filled, that is, from a first inner end of the case 31 along the optical axis to a second inner end of the case, with a transparent fluid 35, such as silicone resin, the entire vibrating member 32 is immersed in the fluid 35, and an inner side of the hollow cylindrical vibrating member 32 is filled with the fluid 35. The AC voltage of the drive signal Cf is adjusted to a frequency that generates a standing wave in the fluid 35 on the inner side of the vibrating member 32.

Figure 3A:
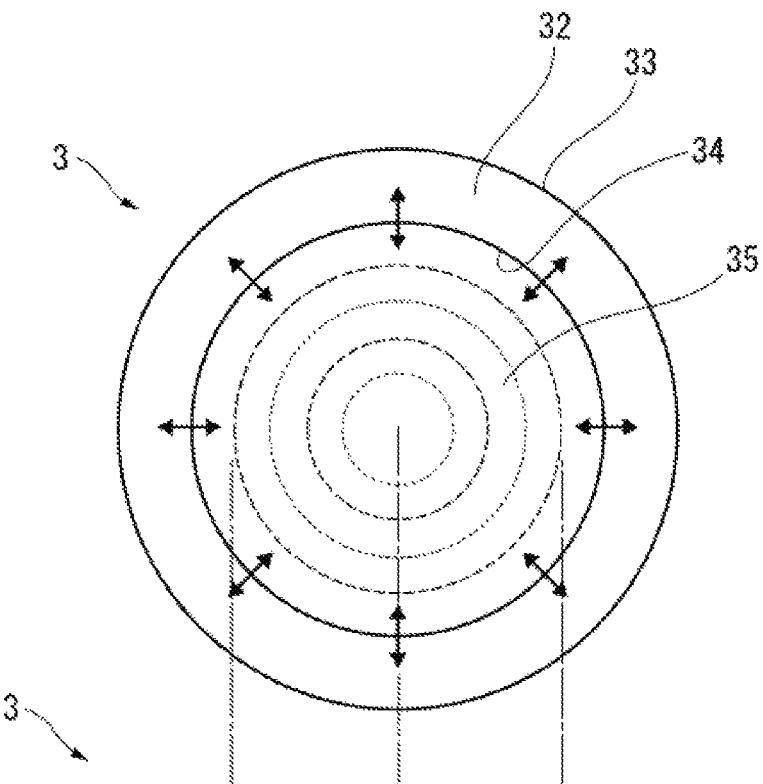
FIGS. 3A to 3C are schematic views illustrating operations of the lens system according to the embodiment.
Figure 3B:
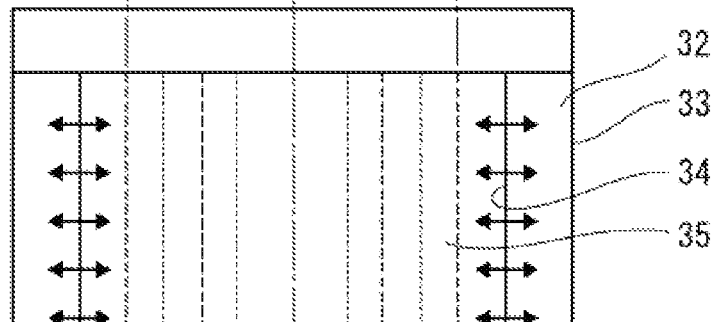
Figure 3C:
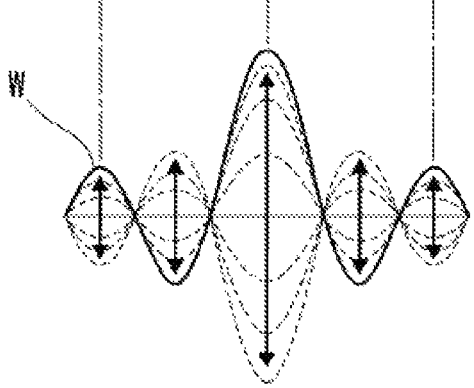

As shown in FIGS. 3A to 3C, in the lens system 3, when the vibrating member 32 is vibrated, a standing wave arises in the interior fluid 35 and concentric circular regions arise where the refractive index alternates (see FIGS. 3A and 3B). At this point, a relationship between a distance from a center axis line of the lens system 3 (radius) and the refractive index of the fluid 35 is as shown by a refractive index distribution W illustrated in FIG. 3C.

In FIGS. 4A to 4E, because the drive signal Cf is a sinusoidal AC signal, bands in the refractive index distribution W of the fluid 35 in the lens system 3 also change in accordance with the drive signal Cf. Also, the refractive index of the concentric circular regions that arise in the fluid 35 changes sinusoidally, and accordingly the focal length Df to the focal position Pf changes sinusoidally. In the state depicted in FIG. 4A, an amplitude of the refractive index distribution W is at its largest, the lens system 3 causes transiting light to converge, the focal position Pf is closer, and the focal length Df is at its shortest. In the state depicted in FIG. 4B, the refractive index distribution W is flat, the lens system 3 allows transiting light to transit unaffected, and the focal position Pf and the focal length Df are at standard values. In the state depicted in FIG. 4C, the amplitude of the refractive index distribution W is at its largest at the opposite pole from that of FIG. 4A, the lens system 3 causes transiting light to scatter, the focal position Pf is farther, and the focal length Df is at its maximum. In the state depicted in FIG. 4D, once again the refractive index distribution W is flat, the lens system 3 allows transiting light to transit unaffected, and the focal position Pf and the focal length Df are at standard values. The state depicted in FIG. 4E returns once again to the state depicted in FIG. 4A and similar fluctuations are repeated thereafter.

In this way, in the variable focal length lens apparatus 1, the drive signal Cf is a sinusoidal AC signal, and the focal position Pf and the focal length Df also fluctuate sinusoidally, as in a focal point fluctuation waveform Mf in FIGS. 4A to 4E. At this time, when pulse illumination is provided to the measured object 9 located at the focal position Pf at a desired point in time on the focal point fluctuation waveform Mf, an image is obtained of the focal position Pf at the focal length Df at the time of illumination. In other words, based on the light emission signal Ci input from the controller 6, by illuminating the surface of the measured object 9 with the illumination light Li from the pulse illuminator 5, reflected light Lr from the measured object 9 is sent to the image detector 4 through the field lens 2 and the lens system 3, and can be detected as an image.

Figure 5:
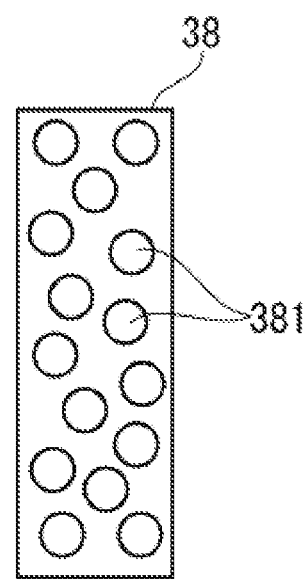
FIG. 5 is a schematic view illustrating a pressure mitigating member according to the embodiment.
Figure 6:
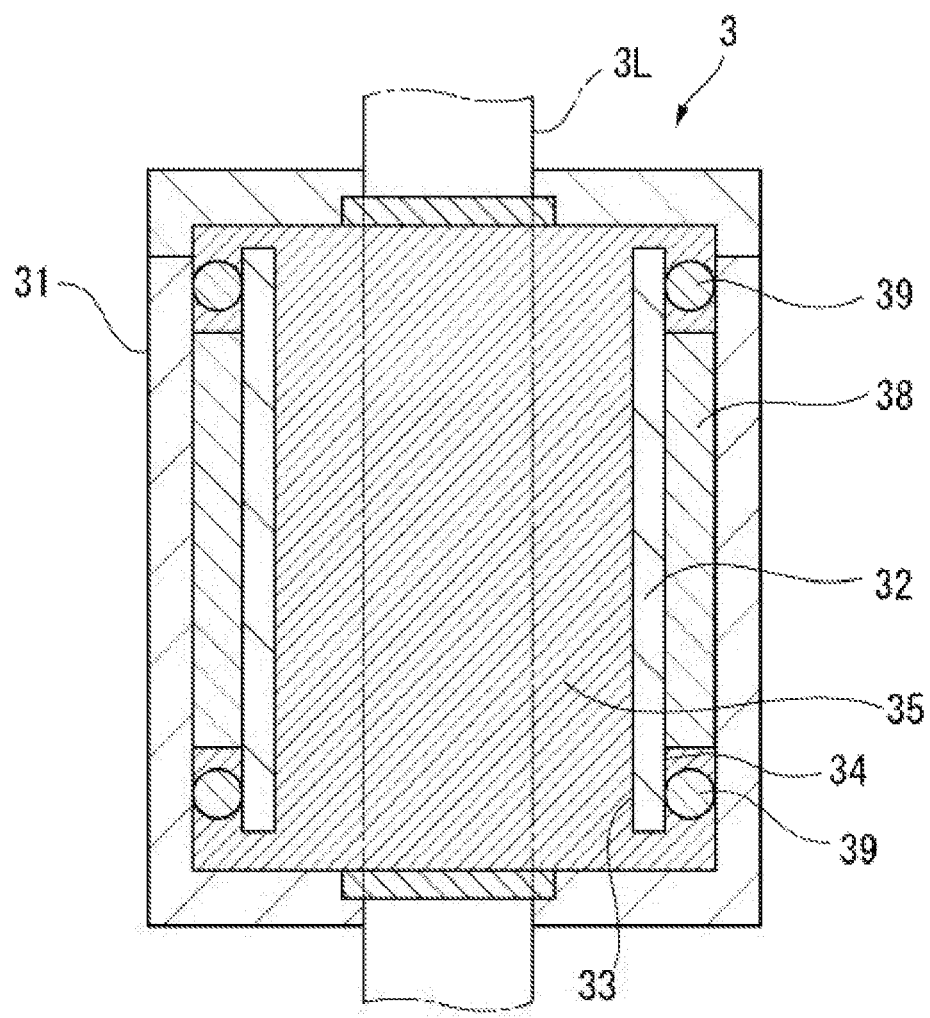
FIG. 6 is a schematic view illustrating an installation state of the pressure mitigating member according to the embodiment.

Returning to FIG. 2, a plurality of sheet-like pressure mitigating members (also referred so as "pressure mitigators") 38 are provided around the entire circumference of the lens system 3, between the outer circumferential surface of the vibrating member 32 and the inner circumferential surface of the case 31. As shown in FIG. 5, the pressure mitigating members 38 are foam bodies made of fluororubber and having a large number of closed cells 381. As shown in FIG. 6, the pressure mitigating members 38 are fixated by bonding or adhesion to one of the outer circumferential surface of the vibrating member 32 or the inner circumferential surface of the case 31. A mechanical method may also be used to fixate the pressure mitigating members 38. The pressure mitigating members 38 are arranged on an outer side of the inner circumferential surface of the vibrating member 32, and are installed in a state that does not interfere with an optical path 3L of the lens system 3. In addition, the pressure mitigating members 38 are totally immersed in the fluid 35 in order to mitigate expansion of the fluid 35.

In the present embodiment as described above, a sine wave, for example, is input as the drive signal Cf to the lens system 3 from the controller 6, causing the refractive index of the lens system 3 to fluctuate. Thereby, the focal position Pf (focal length Df) of the variable focal length lens apparatus 1 can be made to fluctuate sinusoidally at the surface of the measured object 9. In addition, the light emission signal Ci is output by the controller 6 at a specified phase angle having the drive signal Cf as a reference, causing the pulse illuminator 5 to emit light based on the light emission signal Ci. Thereby, the image Lg of the surface of the measured object 9 at the focal length Df at the time of illumination can be guided through the field lens 2 and the lens system 3 toward the image detector 4, and can be detected as the detected image Im.

Meanwhile, the pressure mitigating members 38 are installed in the lens system 3, and therefore even when the interior fluid 35 expands due to an elevation in temperature on the interior of the lens system 3, an elevation in pressure can be mitigated by the pressure mitigating members 38. Here, the pressure mitigating members 38 are installed in gaps between the vibrating member 32 and the case 31, further outward than the vibrating member 32, and do not displace as conventional bubbles do. The pressure mitigating members 38 can therefore avoid influencing the optical path 3L formed on the inner side of the vibrating member 32 and can avoid influencing optical characteristics of the lens system 3.

In the present embodiment, the pressure mitigating members 38 are foam bodies made of fluororubber and having a large number of closed cells 381. Therefore, even when the interior fluid 35 expands due to an elevation in temperature of the lens system 3, each of the closed cells 381 are compressed by the pressure of the fluid 35 and the overall volume of the pressure mitigating members 38 is reduced, enabling the pressure on the interior of the lens system 3 to be mitigated. Moreover, because the pressure mitigating members 38 are made of fluororubber, oil resistance, chemical resistance, heat resistance, flame resistance, weather resistance, and ozone resistance can be ensured regardless of the type of fluid 35 used on the interior of the lens system 3. Also, because of the closed cells 381, the pressure mitigating members 38 can avoid unfavorable situations such as interior air leaking out when crushed by external pressure and being unable to restore an original shape.

The present invention is not limited to the various embodiments described above, and includes modifications within a scope capable of achieving the advantages of the present invention. In the embodiment described above, the plurality of sheet-like pressure mitigating members 38 are provided around the entire circumference of the lens system 3, between the outer circumferential surface of the vibrating member 32 and the inner circumferential surface of the case 31. However, the pressure mitigating member 38 may instead be a single sheet continuous around the entire circumference, or may be continuous in a tubular shape. In the lens system 3, a site where the pressure mitigating member 38 is installed is preferably further outward than the optical path 3L on the inner side of the vibrating member 32 and in a gap between the vibrating member 32 and the case 31. In addition to installation between the outer surface of the vibrating member 32 and the inner surface of the case 31 as in the above-noted embodiment, a space between a circumferential edge in a continuous direction (direction in which the optical path 3L extends) of the vibrating member 32 and the facing inner surface of the case 31, or the like, can be used.

Figure 7:
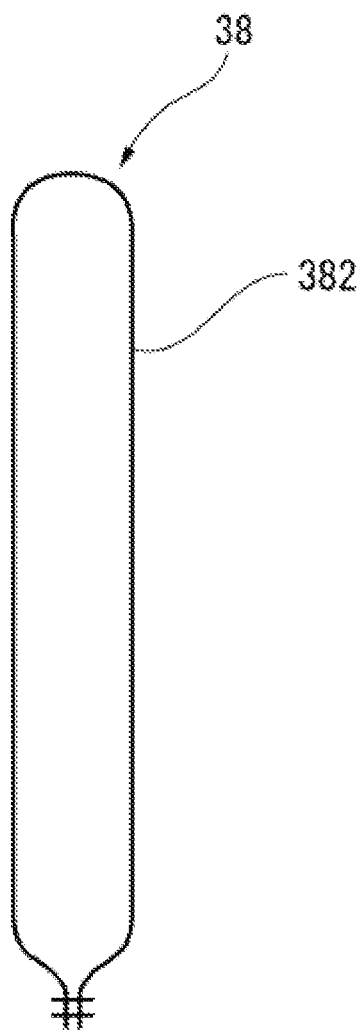
FIG. 7 is a cross-sectional view illustrating a modification of the pressure mitigating member that can be applied to the present invention.

In the embodiment described above, a sheet of fluororubber having a large number of closed cells 381 is used as the pressure mitigating member 38, but a foam body having closed cells and made of a synthetic resin other than fluororubber may also be used. An envelope body having a pressure-compressible fluid sealed on an interior of the envelope, a box body that elastically deforms and reduces in volume due to external pressure, or the like may also be used. As shown in FIG. 7, an envelope body having air sealed on an interior of an envelope 382 of polyethylene resin can be used, for example, as an envelope body having a pressure-compressible fluid sealed on the interior of the envelope. Such an envelope 382 is pliable and can adapt to a large variety of shapes, and therefore can be readily pushed into a gap between the case 31 and the vibrating member 32 of the lens system 3 of the embodiment described above.

Figure 8:
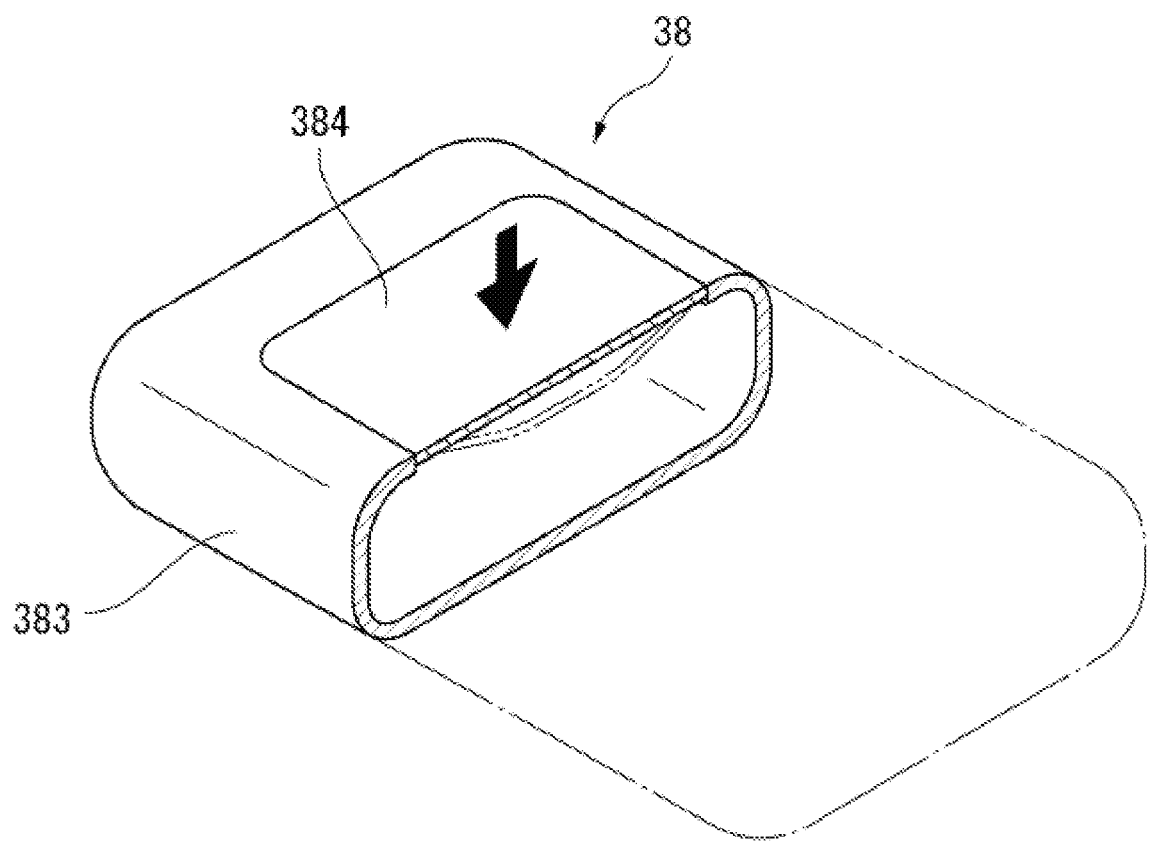
FIG. 8 is a perspective view illustrating a modification of the pressure mitigating member that can be applied to the present invention.
Figure 9:
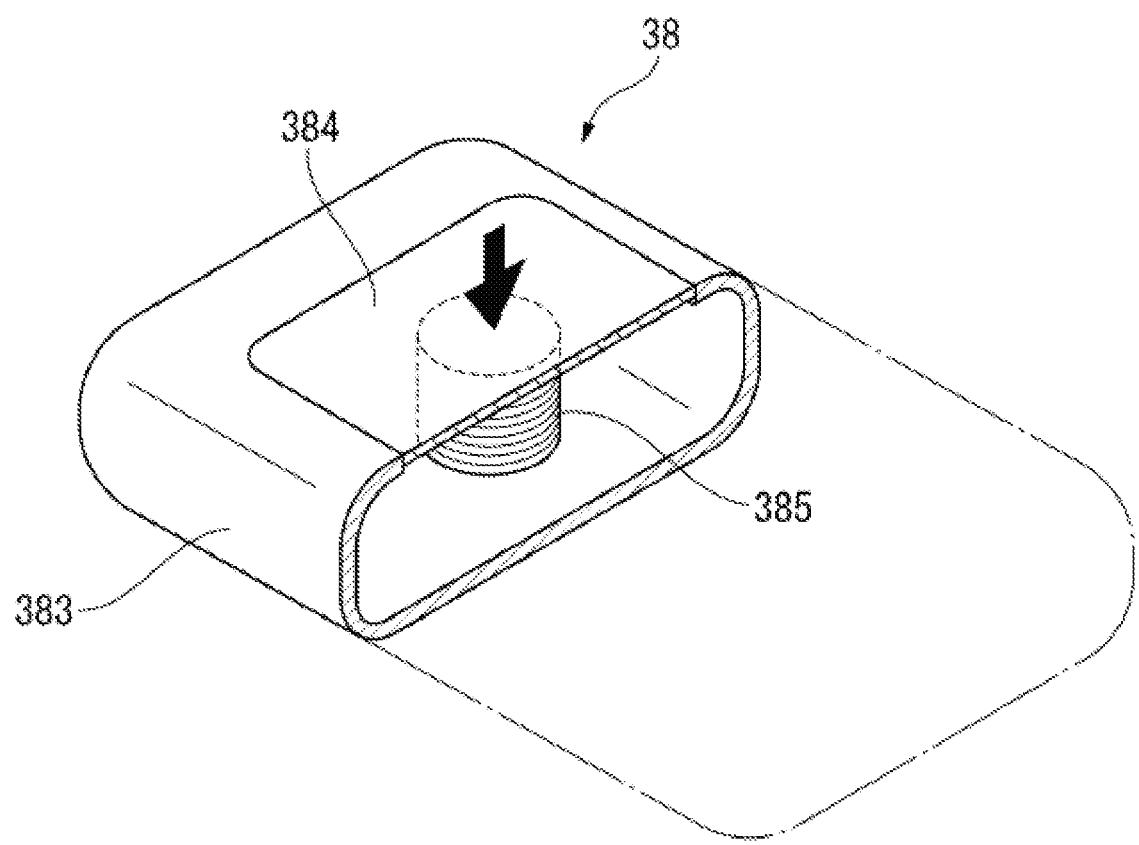
FIG. 9 is a perspective view illustrating a modification of the pressure mitigating member that can be applied to the present invention.
Figure 10:
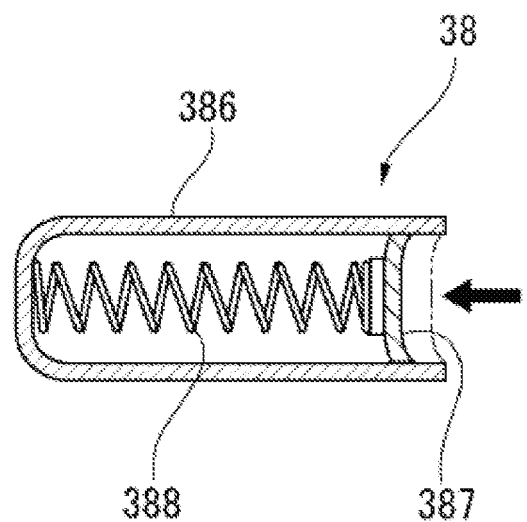
FIG. 10 is a schematic view illustrating a modification of the pressure mitigating member that can be applied to the present invention.

As shown in FIG. 8, as an example of a box body that elastically deforms and reduces in volume due to external pressure, by configuring a flat metal box 383 to have a shallow diaphragm 384 in a flat surface of the box 383, for example, the diaphragm 384 bends inward when receiving external pressure and can thereby reduce in volume. As shown in FIG. 9, an elastic member 385 biasing the diaphragm 384 outward may also be installed on an interior of the box 383. As shown in FIG. 10, a configuration can also be used that makes use of a cylinder 386 and a piston 387 and displaces the piston 387 toward an interior when receiving external pressure. With these configurations, an ability to mitigate pressure can be fine-tuned via the pressure-compressible fluid on the interior or the elasticity of the elastic member 388. Moreover, a member formed with a material whose volume is reduced by an elevation in temperature may also be used as the pressure mitigating member 38.

In the embodiment described above, the drive signal Cf and the focal point fluctuation waveform Mf are configured to be sine waves. However, the drive signal Cf and the focal point fluctuation waveform Mf may instead be triangular waves, saw-tooth waves, rectangular waves, or some other waveform. The specific configuration of the lens system 3 may be modified as appropriate. Instead of having a hollow cylindrical shape, the case 31 and the vibrating member 32 may have a hollow hexagonal shape, for example. The specific configuration of the controller 6 can be selected as appropriate for the application.

The present invention can be used in a lens system and a variable focal length lens apparatus.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A lens system comprising:
a tubular vibrator that vibrates due to an input drive signal;
a case accommodating the vibrator and including a fluid immersing the vibrator, the fluid extending from a first inner end of the case to a second inner end of the case; and
a pressure mitigator installed in a gap between the vibrator and the case, at a position further outward than the vibrator in a radial direction extending from a longitudinal axis of the case, said pressure mitigator being in contact with the fluid.

2. The lens system according to claim 1, wherein the pressure mitigator is a foam body.

3. The lens system according to claim 2, wherein the foam body is made of fluororubber and has a plurality of closed cells.

4. A variable focal length lens apparatus comprising:
a lens system wherein a refractive index changes in response to an input drive signal;
a field lens arranged on the same optical axis as the lens system;
an image detector that detects an image of a measurable object through the lens system and the field lens; and
a pulse illuminator that provides pulse illumination of the measurable object based on an input light emission signal;
wherein the lens system comprises:
a tubular vibrator that vibrates due to an input drive signal;
a case accommodating the vibrator and including a fluid immersing the vibrator, the fluid extending from a first inner end of the case to a second inner end of the case; and
a pressure mitigator installed in a gap between the vibrator and the case, at a position further outward than the vibrator in a radial direction extending from a longitudinal axis of the case, said pressure mitigator being in contact with the fluid.

5. The lens system according to claim 1, wherein the pressure mitigator is immersed in the fluid to mitigate expansion of the fluid.

6. The variable focal length lens apparatus according to claim 4, wherein the pressure mitigator is immersed in the fluid to mitigate expansion of the fluid.

7. The lens system according to claim 1, wherein the pressure mitigator comprises a body having closed cells, and the closed cells are configured to be compressed by the fluid upon an expansion of the fluid within the case.

8. The variable focal length lens apparatus according to claim 4, wherein the pressure mitigator comprises a body having closed cells, and the closed cells are configured to be compressed by the fluid upon an expansion of the fluid within the case.

* * * * *